(12) United States Patent
Chou et al.

(10) Patent No.: US 6,988,800 B2
(45) Date of Patent: Jan. 24, 2006

(54) TORIC CONTACT LENS WITH MENISCUS-SHAPED FLATTENED TOP AND BOTTOM ZONES FOR DYNAMIC STABILIZATION

(75) Inventors: Yu-Jan Chou, Taipei (TW); Chien-Hua Ku, Keelung (TW); Cheng-Liang Lee, Hsi Chih (TW)

(73) Assignee: St. Shine Optical Co., Ltd., Hsi Chih (TW)

( * ) Notice: Subject to any disclaimer, the term of this patent is extended or adjusted under 35 U.S.C. 154(b) by 0 days.

(21) Appl. No.: 10/752,175

(22) Filed: Jan. 6, 2004

(65) Prior Publication Data

US 2005/0146678 A1 Jul. 7, 2005

(51) Int. Cl.
*G02C 7/04* (2006.01)

(52) U.S. Cl. .................. 351/160 R; 351/174
(58) Field of Classification Search ................ 351/159, 351/160 R, 160 H, 174
See application file for complete search history.

(56) References Cited

U.S. PATENT DOCUMENTS

| | | | |
|---|---|---|---|
| 4,095,878 A * | 6/1978 | Fanti ......................... | 351/161 |
| 5,455,641 A | 10/1995 | Hahne et al. ........... | 351/160 H |
| 5,532,768 A | 7/1996 | Onogi et al. ............ | 351/160 R |
| 5,650,837 A * | 7/1997 | Roffman et al. ............ | 351/161 |
| 5,652,638 A * | 7/1997 | Roffman et al. ............ | 351/161 |
| 5,861,114 A * | 1/1999 | Roffman et al. ............ | 264/2.5 |
| 5,988,813 A | 11/1999 | Neadle et al. .............. | 351/177 |
| 6,135,594 A | 10/2000 | Windey et al. ......... | 351/160 H |
| 6,176,578 B1 | 1/2001 | Clutterbuck et al. ..... | 351/160 R |
| 6,183,082 B1 | 2/2001 | Clutterbuck ............ | 351/160 R |

FOREIGN PATENT DOCUMENTS

TW 424168 7/1988

\* cited by examiner

*Primary Examiner*—Scott J. Sugarman
*Assistant Examiner*—Darryl J. Collins
(74) *Attorney, Agent, or Firm*—Schneck & Schneck; Thomas Schneck

(57) ABSTRACT

A toric contact lens incorporating meniscus-shaped top and bottom flattened zones for dynamic stabilization comprises a convex outer surface and a concave inner surface. The lens has a central optic zone, a top meniscus-shaped flattened zone formed between upper edge of the optic zone and upper edge of the convex outer surface, and a bottom meniscus-shaped flattened zone between lower edge of the optic zone and lower edge of the convex outer surface, where a left intersection and a right intersection are formed by said top flattened zone intersecting said bottom flattened zone on both sides, which in turn form a plurality of horizontal positional lines each.

2 Claims, 2 Drawing Sheets

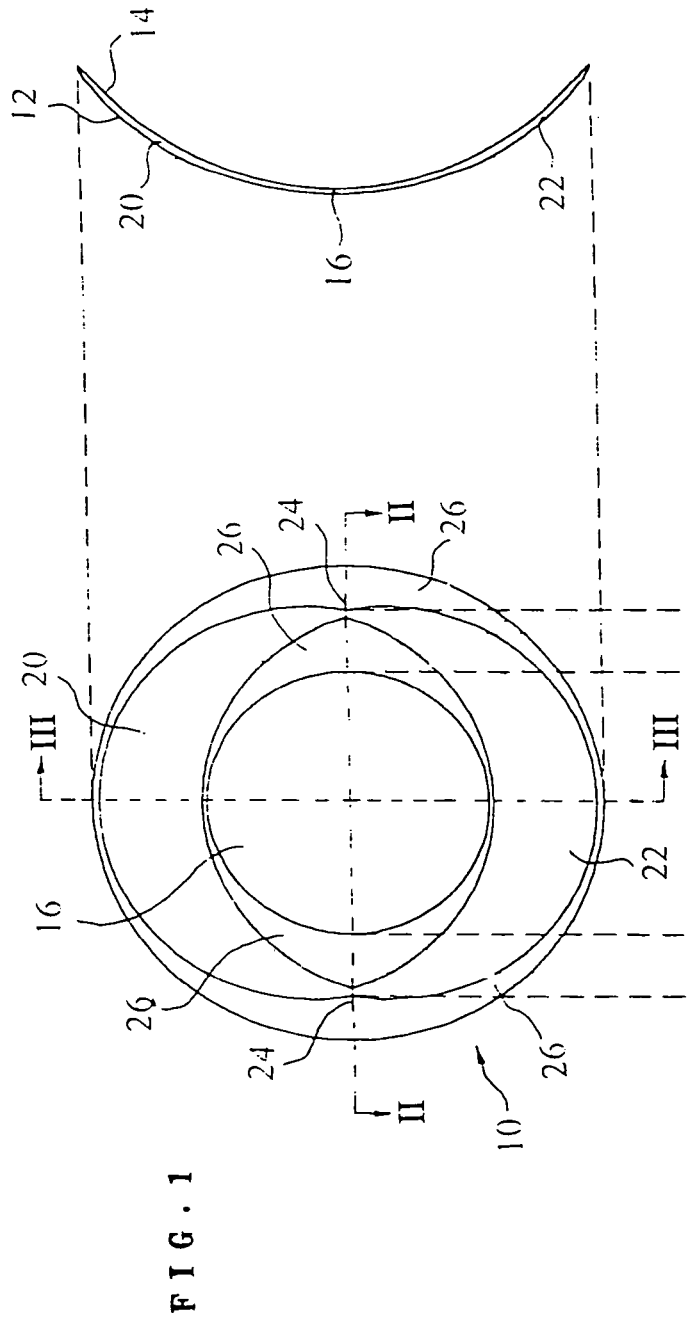

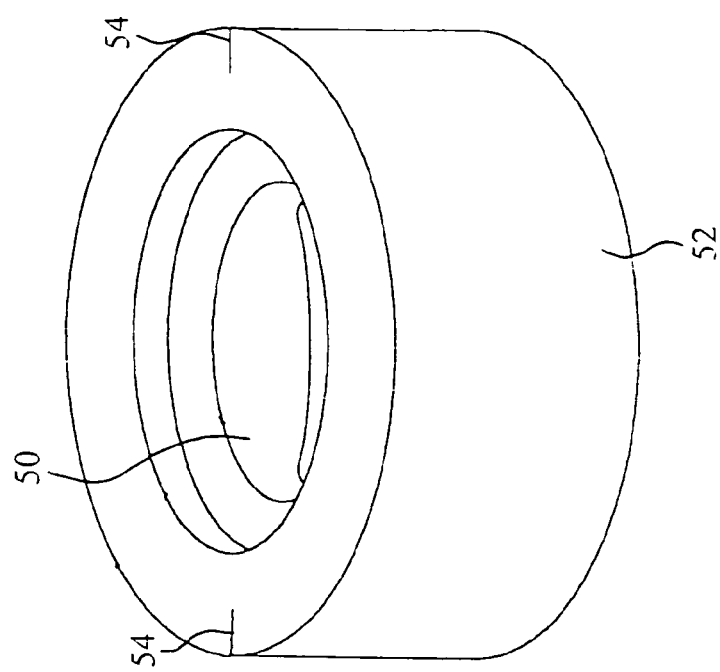
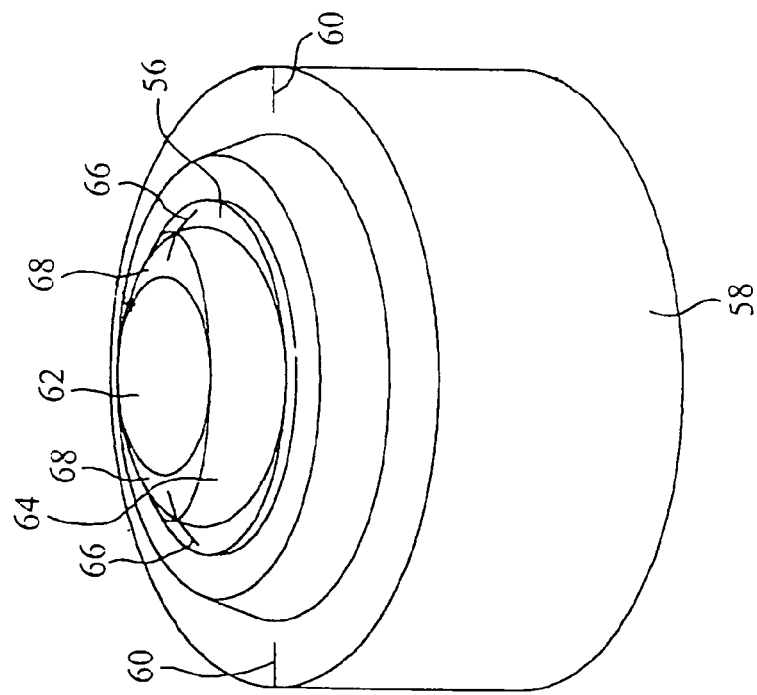
FIG. 4

TORIC CONTACT LENS WITH MENISCUS-SHAPED FLATTENED TOP AND BOTTOM ZONES FOR DYNAMIC STABILIZATION

BACKGROUND OF THE INVENTION

1. Field of the Invention

The present invention relates to contact lenses, and more particularly pertains to soft contact lens of the toric type that incorporates meniscus-shaped top and bottom flattened zones to dynamically stabilize the orientation of the lens.

2. Description of the Related Art

It is understood that the correction of certain optical defects can be achieved through presenting non-spherical corrective characteristics into a contact lens, such as cylindrical, bifocal, or multifocal, which may be problematic in that the contact lens need to be maintained at a specific orientation while on the eye to be effective. Nonetheless, because of the effects of blinking, eyelids, and tear fluid movement, the lens will rotate on the eye.

Lenses designed to maintain an on-eye orientation are typically categorized into two types. One type uses static stabilization to maintain lens orientation. Examples of the static stabilization methods include prismatic balancing, thickening the lower lens edge, supporting the lens on the lower eyelid, forming depressions or elevations on the lens' surface, and tapering off the lens edge.

A second type uses the movement of the eyelids to dynamically stabilize in maintaining lens orientation. Methods of the dynamic stabilization include reducing the thickness of outer surface of the lens at two symmetrical regions, thickening the two outer regions in the horizontal center axis, and flattening top and bottom regions of the lens.

The known methods for maintaining lens orientation suffer from several defects, wherein a disadvantage is demanding specialized tools for production; moreover, lenses by these methods are uncomfortable to wear, for example, in the tapered-off method that causes a sharp edge of the lens, which would distress the wearers. Therefore, in the Taiwanese Patent Publication No. 424168 by Timothy A. Clutterbuck, a dynamically stabilized contact lens is disclosed, wherein the lens incorporates variably-shaped lenticular zones, freeing the production from specialized tools and comforting the wearers while wearing.

However, the dynamically stabilized contact lenses mentioned above exhibit that the difference in thickness between the flattened and un-flattened zones on left and right sides of the lens is not apparent, and, that is to say, the flattened regions are considerably wider than the un-flattened regions on both sides, so that the little variance in thickness causes the lens rotating when the eyelids are blinking. Hence, the toric contact lens is weak in stabilizing its lens orientation. The required tools for the production of the lens include convex inserter and convex inserter carrier (the so-called rear mold section by one skilled in the art). Since the lenticular regions of the convex inserter is tough to form positional marks, it is then laborious to align the inserter with the inserter carrier, and, subsequently, giving rise to the deviation of astigmatic angle while in the production; moreover, without marking a wearing sign on the lens, it is troublesome for the wearers with astigmatism.

It is accordingly the object of the present invention to provide a toric contact lens with meniscus-shaped top and bottom flattened zones to dynamically stabilize the orientation of the lens, which will considerably augment the stability of angular orientation of the lens, ease the alignment for the positional lines of the inserter and the carrier, and offer the wearers handy way to carry on the toric contact lenses.

SUMMARY OF THE INVENTION

The present invention provides toric contact lens with top and bottom meniscus-shaped flattened zones to dynamically stabilize the orientation of the lens, comprises a convex outer surface and a concave inner surface, where the lens has a central optical zone. The top meniscus-shaped flattened zone is formed between upper edge of the optic zone and upper edge of the convex outer surface, and the bottom meniscus-shaped flattened zone is formed between lower edge of the optic zone and lower edge of the convex outer surface, where a left and right intersections are formed by the top flattened zone intersecting the bottom flattened zone on both sides, which in turn form a plurality of horizontal positional lines each.

The curved shape of the convex outer surface is the same with the curved shape of the convex inserter, and the positional lines of the lens are a counterpart of the positional lines on the convex inserter; the positional lines on the inserter are devised to align with the positional lines of a convex inserter carrier.

An object of the present invention is to provide a toric contact lens with top and bottom meniscus-shaped flattened zones to dynamically stabilize the orientation of the lens, where the top and the bottom meniscus-shaped flattened zones will facilitate the stability of angular orientation of the lens, advancing the ease of aligning the positional lines between the inserter and the carrier, and simplifying the wearing only by a glimpse at the mark on the lens.

Other objects and advantages of the present invention will become apparent from the detailed description to follow taken in conjunction with the appended claim.

BRIEF DESCRIPTION OF THE DRAWINGS

FIG. 1 is a plan view of a preferred embodiment of the invention;

FIG. 2 is a horizontal section view of the lens shown in FIG. 1 along the line II—II;

FIG. 3 is a vertical section view of the lens shown in FIG. 1 along the line III—III; and FIG. 4 is a schematic diagram of the mold assembly of the invention for generating the contact lenses.

DETAILED DESCRIPTION OF PREFERRED EMBODIMENT

FIG. 1 is a plan view of a preferred embodiment of the present invention. FIG. 2 is a horizontal section view of the lens shown in FIG. 1 along the line II—II. FIG. 3 is a vertical section view of the lens shown in FIG. 1 along the line III—III. A toric contact lens 10 incorporating dynamic stability, comprises a convex outer surface 12 and a concave inner surface 14, and an optic zone 16 over the center of the contact lens 10. A top meniscus-shaped flattened zone 20 is formed between upper edge of the optic zone 16 and upper edge of the convex outer surface 12, and a bottom meniscus-shaped flattened zone 22 is formed between lower edge of the optic zone 16 and lower edge of the convex outer surface 12, where a left and right intersections are formed by the top flattened zone 20 intersecting the bottom flattened zone 22 on both sides, which in turn form a horizontal left and right positional lines 24. Lenticular zones 26 are formed from the left and right edges of the optic zone 16 respectively and extended up to the left and right edges of the convex outer surface 12, excluding areas of the top flattened zone 20 and bottom flattened zone 22, and the thickness of the lenticular zones 26 is thicker than that of the top flattened zone 20 and bottom flattened zone 22.

The horizontal left and right positional lines 24 are formed on the left and right sides of the contact lens 10, where one purpose is to offer the toric-lens wearers a wearing angle, a prompt way to wear, without even an on-eye adjustment instead. Additionally, the top meniscus-shaped flattened zone 20 and the bottom meniscus-shaped flattened zone 22, formed between the upper and lower edges of the optic zone 16 and the upper and lower edges of the convex outer surface 12, are slab offs on the upper and lower of the lens 10. The slab offs are proved to be comfortable for the wearers when blinking. Furthermore, an apparent discrepancy in between the lenticular zones 26, located on left and right sides of the lens 10, and the flattened zones, the top flattened zone 20 and the bottom flattened zone 22, shows that narrower slab-off areas on the upper and lower sides of the lens 10 are easier for eyelids to blink, while the wider regions, the lenticular zones 26, have a considerable thickness over the leftmost and rightmost sides of the lens 10 to achieve highly eyelid rotational orientation and stabilization.

A process flow for the production of contact lenses generally includes: the production of convex inserter and concave inserter, the production of convex and concave plastic molds by the injection molding based on the desired convex and concave inserters, the casting of a liquid monomer into the cavity of the convex and concave plastic molds, the monomer polymerized to form a solid by exposure to UV light or heat, the remove of the solid lens from the casting container, the hydration and inspection for the lens, and packaging, etc.

Accordingly, to produce a convex inserter incorporating top and bottom meniscus-shaped flattened zones on its curved surface is a prerequisite for successfully to produce the toric lens that incorporating the top and bottom meniscus-shaped flattened zones. A schematic diagram of the mold assembly used to mold the contact lens of present invention is illustrated in FIG. 4.

Referring to FIG. 4, a concave inserter 50 is installed inside a concave inserter carrier 52, where a pair of diametrically opposed positional lines 54 is marked on the brim of the hollow concave carrier 52. The correction of astigmatic angle associated with refractive abnormalities can be devised on the curved surface of the concave inserter 50, where the contact lenses produced can therefore provide the correction for the astigmatism. A convex inserter 56 is installed inside a convex inserter carrier 58, where a pair of diametrically opposed positional lines 60 is marked on the brim of the hollow convex carrier 58, and the curved shape of the convex outer surface 12 equals the curved shape of the convex inserter 56 shown in FIG. 1. It also shows an analogy between the optic zone 16 of the convex outer surface 12 and the optic zone 62 of the convex inserter 56; another analogy between the top flattened zone 20 and the bottom flattened zone 22 of the convex outer surface 12 and the top flattened zone (not shown in the figure) and the bottom flattened zone 64 of the convex inserter 56; and a further analogy between the positional lines 24 of the convex outer surface 12 and the positional lines 66 of the convex inserter 56.

Based on the design of the meniscus-shaped top and bottom flattened zones of the convex inserter 56 illustrated in the above, the left and right intersections, corresponding to the cross of symmetrically the top flattened zone and bottom flattened zone 64, are handy to be labeled with the positional lines 66. The fact that the left and right lenticular regions 68 of the convex inserter 56 are spacious to mark positional lines 66, expedites the alignment with the positional lines 60 of the convex inserter carrier 58. Once the positional lines 60 of the convex inserter carrier 58 are exactly aligned with the positional lines 54 of the concave inserter carrier 52, a toric contact lens of a desired precision in optical angle is ready for the production.

It is an advancement of the present invention to form left and right positional lines on left and right sides of a toric contact lens, where the marks are handy for referencing when wearing, and freeing the toric lens from any on-eye adjustment.

It is another advancement of the invention to incorporate meniscus-shaped flattened zones on top and bottom of the toric lens to comfort the wearers.

It is a further advancement of the invention to considerably differentiate the thicknesses between the lenticular zones on left and right sides and the flattened zones on top and bottom of the toric lens, which helps to provide a rotational stability while the eyelids are blinking, and achieves a highly rotational orientation and stabilization.

It is still another advancement of the invention to incorporate the meniscus-shaped top and bottom flattened zones on the convex inserter, which is supportive to form the positional lines readily, and to align the positional lines of the inserter with the positional lines of the convex inserter carrier easily. Once the positional lines of the convex inserter carrier are exactly aligned with the positional lines of the concave inserter carrier, a toric contact lens of a desired precision in optical angle is ready for the production.

The invention may be embodied in other specific forms without departing from the spirit or essential characteristics thereof. The scope of the invention is indicated by the appended claims rather than by the foregoing description, and all changes which come within the meaning and range of equivalency of the claims are therefore intended to be embraced therein.

What is claimed is:

1. A toric contact lens incorporating meniscus-shaped flattened top and bottom zones for the dynamic stabilization, comprising a convex outer surface and a concave inner surface, said toric contact lens having a central optical zone, wherein said to meniscus-shaped flattened zone is formed between upper edge of said optic zone and upper edge of said convex outer surface, and said bottom meniscus-shaped flattened zone is formed between lower edge of said optic zone and lower edge of said convex outer surface, where a left intersection and a right intersection are formed by said top flattened zone intersecting said bottom flattened zone on both sides, which in turn form a plurality of horizontal positional lines each, and wherein a curved shape of said convex outer surface equals a curved shape of a convex inserter, and said plurality of positional lines of said toric contact lens are correspondent to a plurality of positional lines of said convex inserter.

2. A toric contact lens incorporating meniscus-shaped flattened top and bottom zones for the dynamic stabilization as claimed in claim 1, wherein said plurality of positional lines of said convex inserter are in the alignment with a plurality of positional lines of a convex inserter carrier.

* * * * *